No. 634,846. Patented Oct. 10, 1899.
C. C. BOWEN & C. R. TWITCHELL.
ANIMAL TRAP.
(Application filed Feb. 18, 1899.)
(No Model.) 2 Sheets—Sheet 2.
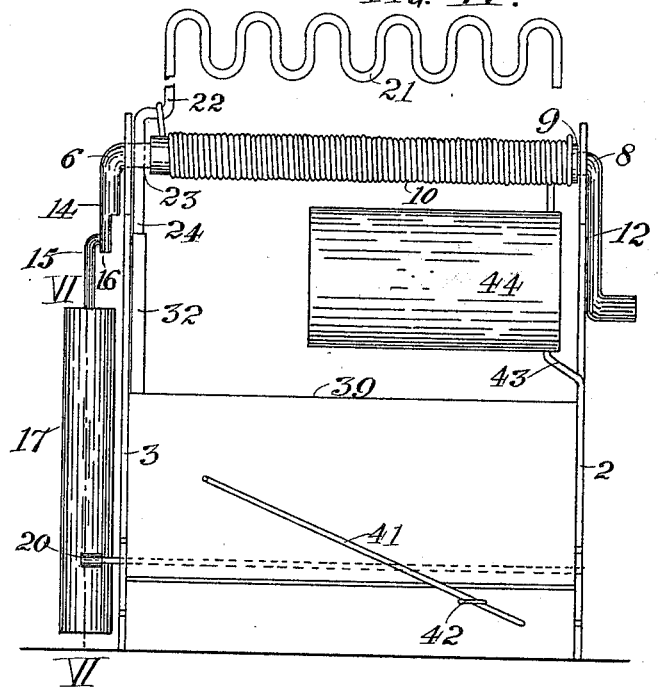
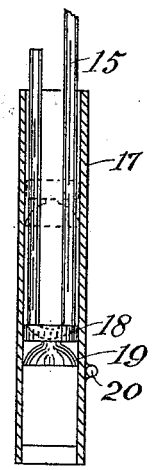
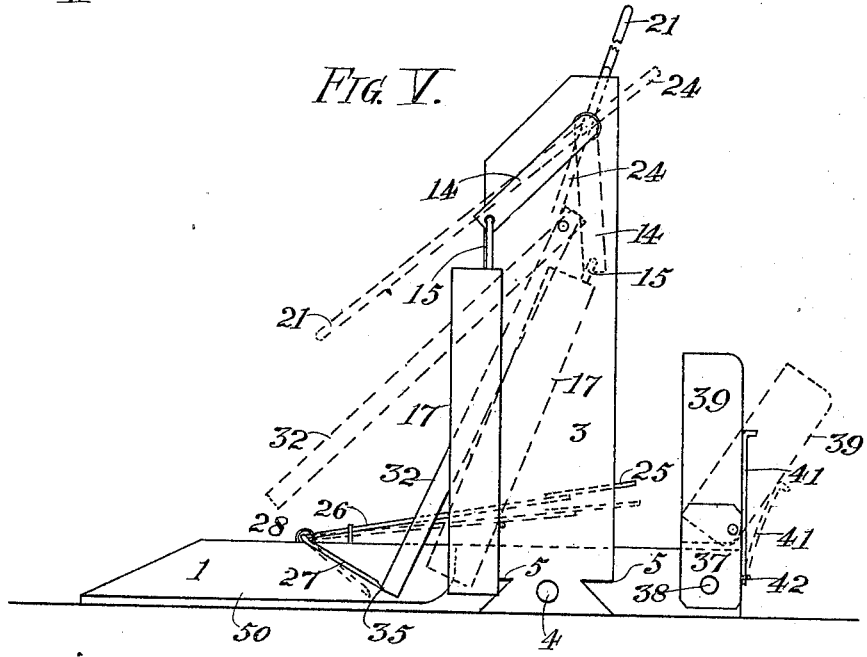

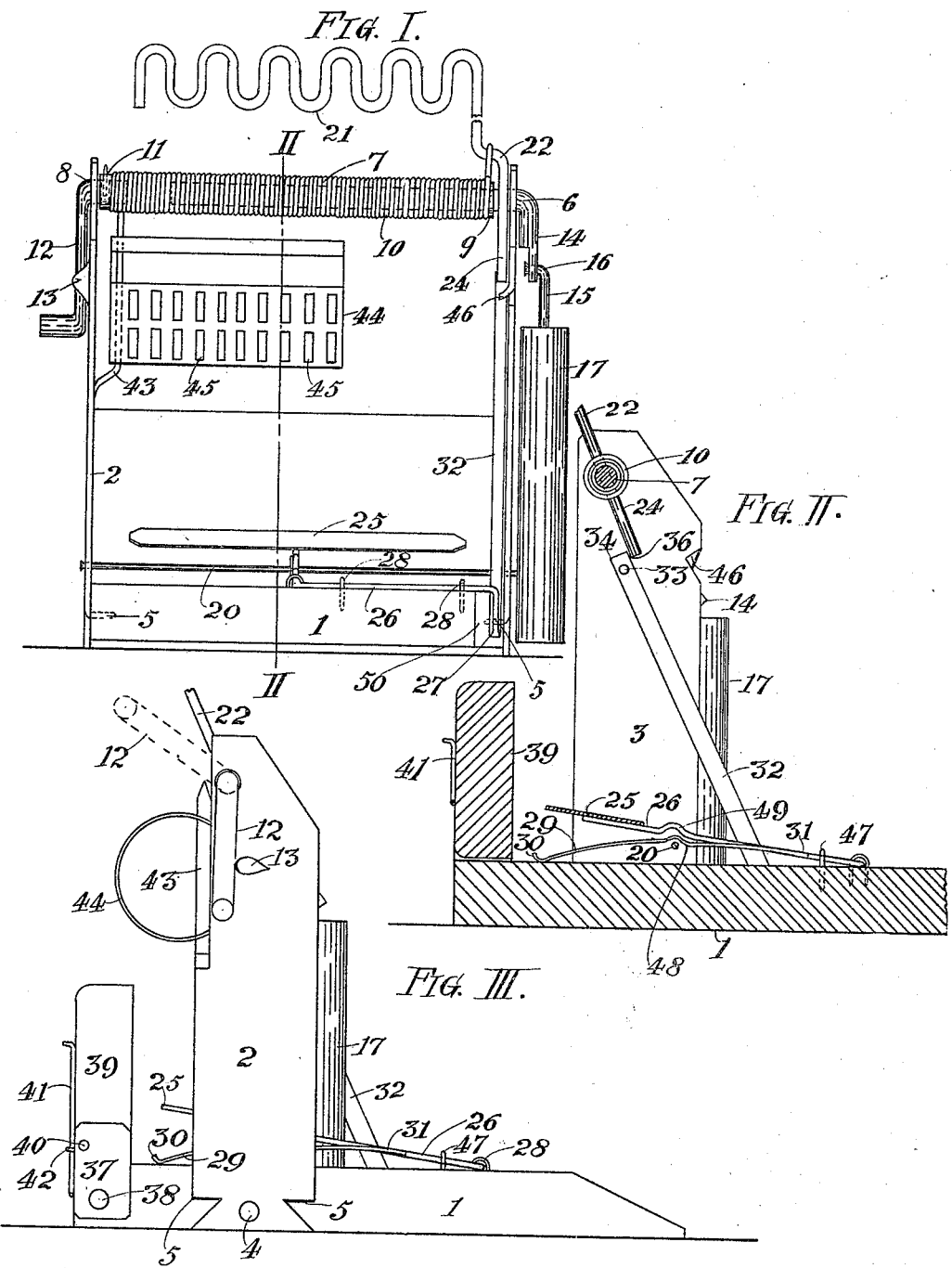

UNITED STATES PATENT OFFICE.

CALVIN C. BOWEN AND CHARLES R. TWITCHELL, OF LOS ANGELES, CALIFORNIA, ASSIGNORS TO WILLIAM M. BOWEN, OF SAME PLACE.

ANIMAL-TRAP.

SPECIFICATION forming part of Letters Patent No. 634,846, dated October 10, 1899.

Application filed February 18, 1899. Serial No. 706,061. (No model.)

*To all whom it may concern:*

Be it known that we, CALVIN C. BOWEN and CHARLES R. TWITCHELL, citizens of the United States, residing at Los Angeles, in the county of Los Angeles and State of California, have invented certain new and useful Improvements in Animal-Traps, of which the following is a full, clear, and exact description, reference being had to the accompanying drawings, which form a part of this specification.

Our invention relates to certain new and useful improvements in that class of animal-traps where the animal is killed by the operation of the trap; and our invention consists in certain features of novelty hereinafter described and claimed.

Figure I is a front elevation of our improved trap. Fig. II is a vertical section taken on line II II, Fig. I. Fig. III is a side elevation. Fig. IV is a rear elevation. Fig. V is a side elevation showing the opposite side of the trap from Fig. III. Fig. VI is a longitudinal section taken on line VI VI, Fig. IV, showing the pneumatic check.

Referring to the drawings, 1 represents a base-block for supporting the various parts.

2 3 represent standards secured to the base-block at their lower ends, said standards supporting certain mechanism of the trap. The lower ends of said standards are preferably secured to the side of the block 1 by means of a central screw 4 and by having inbent sections 5 of the standards driven into the side of the base-block.

6 represents a rod extending transversely of the trap and journaled near the upper ends of the standards 2 3, said rod 6 being formed in sections 7 8, having a sleeve 9, surrounding the rod, on which is mounted a coil-spring 10. One end of the coil-spring 10 is secured at 11 to the section 8 of the rod 6, said section 8 being provided with a crank 12 for winding up or tightening the coils of said spring.

13 represents a catch or lug on the outer side of the standard 2, said lug limiting the backward movement of the crank 12 when the spring has been wound up.

14 represents a crank on the section 7 of the rod 6.

15 represents a piston-rod having its upper end pivoted at 16 to the crank 14, said rod 15 being formed in U shape and extending into a pneumatic checking-cylinder 17.

18 represents a disk on the lower end of the piston 15, and 19 represents a valve secured on the under side of the disk 18. The cylinder 17 is pivoted to one end of a rod 20, said rod 20 extending transversely of the trap and being journaled to the standards 2 3.

21 represents a striker for killing the animals, the body of the striker extending substantially the width of the trap and being preferably formed of one piece, consisting of a series of return-bends.

22 represents the stem of the striker, which is secured at 23 to the section 8 of the rod 6 by passing through the same.

24 represents a pin which is preferably a continuation of the stem 22 and which extends outwardly from the rod 6 in the direction opposite to that of the striker 21.

25 represents a table for discharging the trap, said table being mounted on the inner end of a bent rod 26, which is provided at its opposite end with a trigger 27.

28 represents staples by which the bent rod 26 is pivoted to the base-block 1.

29 represents a spring having its loose inner end 30 resting upon the base-block 1 and having its opposite end attached at 31 to the rod 26, which supports the table 25, said spring normally holding the table 25 in a raised position.

32 represents a lever having its upper end pivoted to the standard 3, as shown at 33, there being a short arm 34 on said lever extending above the pivotal point 33. When the trap is set, the lower end of the lever 32 engages the inner end of the trigger 27, as shown at 35, at which time the lower end of the pin 24 comes in contact with the short arm of the lever 32, as shown at 36.

37 represents brackets secured at 38 to the rear end of the base-block 1.

39 represents a striking-block pivoted at 40 to the brackets 37.

41 represents a spring having its upper end bearing against the rear face of the block 39 and its lower end secured at 42 to the base-block 1, said spring 41 serving to normally hold the block 39 in a vertical position, but which permits it to bend backward, as shown in dotted lines, Fig. V, when the striker revolves.

43 represents a bracket on the standard 2, which is preferably bent inwardly and extends parallel with the standard.

44 represents a bait-holder, preferably made cylindrical in form and supported by the bracket 43.

45 represents a series of slots or orifices in the bait-holder, which permit the bait to be seen by the animal and readily admit the escape of odor from the same. The bait-holder is slipped over the top of the bracket 43 and may be readily removed therefrom when desired.

46 represents an inbent ear on the bracket 3, which limits the upward movement of the lever 32.

The operation is as follows: The spring 10 is wound up by the crank 12 to a sufficient degree, the trap being set by the lower end of the lever 32 coming in contact with the trigger 27 and the pin 24 coming in contact with the upper end of said lever 32. When the animal steps upon the table 25, depressing the same, the trigger 27 is correspondingly depressed, as shown in dotted lines, Fig. V, permitting the lower end of the lever 32 to fly upwardly, which lever permits the lower end of the pin 24 to pass over the top of the lever 32, thus permitting the striker 21 to make one revolution, the striker knocking the animal against the block 39 and killing it. The block being pivoted recedes in front of the striker and permits the striker to continue its revolution, the block being normally returned to its upright position by means of the spring 41. As soon as the weight is removed from the table 25 the spring 29 raises it upwardly into its normal position, which also raises up the trigger 27 in position to catch the lower end of the lever 32, and as the striker continues to revolve the pin 24 comes in contact with the upper end of the lever and the striker is locked in the position as shown in Fig. I until the table is again depressed and the operation repeated.

To prevent too much lateral and vertical play of the spring 29 and table 25, I provide a staple 47, that limits the upward movement of the rod 26, and also provide bends 48 49 in the spring 29 and rod 26, said bends allowing said spring and rod to fit down upon the rod 20, and thus limiting the downward and lateral movement of said parts. The base-block 1 is also cut away, as shown at 50, to permit the movement of the trigger 27 and lever 32.

We claim as our invention—

1. In an animal-trap the combination of a suitable base, a bent rod pivoted thereto having a trigger on one end, a table on its opposite end, suitable standards secured to the base, a rod journaled in said standards, a spring on said rod, a striker secured to the rod, a pin on said rod and a pivoted lever with which said pin comes in contact, substantially as set forth.

2. In an animal-trap the combination of a suitable base-block, standards secured to the block, a rod journaled to said standards, a spring on said rod, a striker connected with the rod, a pin extending from the rod, a pivoted lever, a bent rod pivoted to the base-block, a table on said rod, a spring connected with said rod and a trigger on the rod, substantially as set forth.

3. In an animal-trap the combination of a base-block, standards secured to the block, a pneumatic check-cylinder pivoted to the standards, an actuating-rod and a spring mounted between the standards, a crank for winding up said rod located at one of its ends, a crank on the opposite end of said rod, a piston-rod pivoted to the last-named crank, a disk on the lower end of said piston-rod, and a valve secured beneath the disk, substantially as set forth.

4. In an animal-trap the combination of a suitable base, standards secured to the base, a rod journaled to said standards, an actuating-spring on said rod, a striker connected with said rod, a pneumatic cylinder having pivotal connection with the standards, and a U-shaped piston operating in said cylinder and having connection with the rod that bears the striking-arm, substantially as set forth.

5. In an animal-trap the combination of a base-block, standards secured to the block, a striking-arm journaled to the standards, means for actuating the striking-arm, a table having a trigger in connection therewith, means for connecting the trigger with the striking-arm mechanism, a striking-block, and a spring for normally holding the striking-block in a vertical position, substantially as set forth.

6. In an animal-trap the combination of a base-block, a striking-block pivoted thereto, a table having pivotal connection with the base-block, means for limiting the upward movement of the table, a spring for normally holding the table in a raised position, a suitable striking device, a pneumatic check-cylinder having connection with the striking device, suitable standards secured to the base-block, a rod secured to the standards and bends in the spring for raising the table and the rod which supports the table, said bends adapted to engage said rod, substantially as set forth.

7. In an animal-trap the combination of a base, standards secured to the base, a bent portion on the lower end of said standards adapted to be driven into the base, a rod journaled to the standards, a striking-arm connected with the rod, means for revolving said striking-arm, a table pivoted to the base-block and means for connecting said table with the striking-arm, substantially as set forth.

8. In an animal-trap the combination of a base-block, standards secured thereto, a bracket on one of said standards, and a receptacle for holding bait removably secured to said bracket with suitable apertures formed in the face of the bait-receptacle, substantially as set forth.

9. In an animal-trap the combination of a base, standards secured to the base, a table pivoted to the base having a trigger connection therewith, a lever pivoted to one of the standards, a recess in the base into which the trigger and lever extend, a striking mechanism and an ear on one of said standards for limiting the upward movement of said lever, substantially as set forth.

CALVIN C. BOWEN.
CHARLES R. TWITCHELL.

Witnesses:
EMMET H. WILSON,
JAS. E. KNIGHT.